May 8, 1923. 1,454,422
K. ABE
PROCESS FOR MAKING EDIBLE MALT AND SPROUTS
Filed Feb. 18, 1922 2 Sheets-Sheet 1

INVENTOR
KUMAKICHI ABE
BY
Francis C. Huebner,
ATTORNEY

May 8, 1923.

K. ABE 1,454,422

PROCESS FOR MAKING EDIBLE MALT AND SPROUTS

Filed Feb. 18, 1922    2 Sheets-Sheet 2

INVENTOR
KUMAKICHI ABE
BY
Francis C. Huebner,
ATTORNEY

Patented May 8, 1923.

1,454,422

UNITED STATES PATENT OFFICE.

KUMAKICHI ABE, OF SELMA, CALIFORNIA.

PROCESS FOR MAKING EDIBLE MALT AND SPROUTS.

Application filed February 18, 1922. Serial No. 537,493.

*To all whom it may concern:*

Be it known that I, KUMAKICHI ABE, a citizen of Japan, and resident of Selma, in the county of Fresno and the State of California, have invented a new and useful Improvement in Processes for Making Edible Malt and Sprouts, of which the following is a specification.

My invention relates to a process for propagating malt or bean sprouts for edible use. It is well known that the oriental people consider bean malt or sprouts a great delicacy, and the larger and more tender the sprouts the greater their food value. The object of the process I have invented for producing said sprouts is to form very large tender sprouts, growing them approximately 8 to 10 inches in 55 hours, cleansing them while in process of growing so that the resultant product is perfectly clean and ready for use, and by the rapid growth and other attention which I give to the growing product a malt product, or bean sprout is produced which has superior flavor and tender qualities over those produced by other means. The fact that the plant is washed while in a growing stage makes a superior product.

Figure 1:
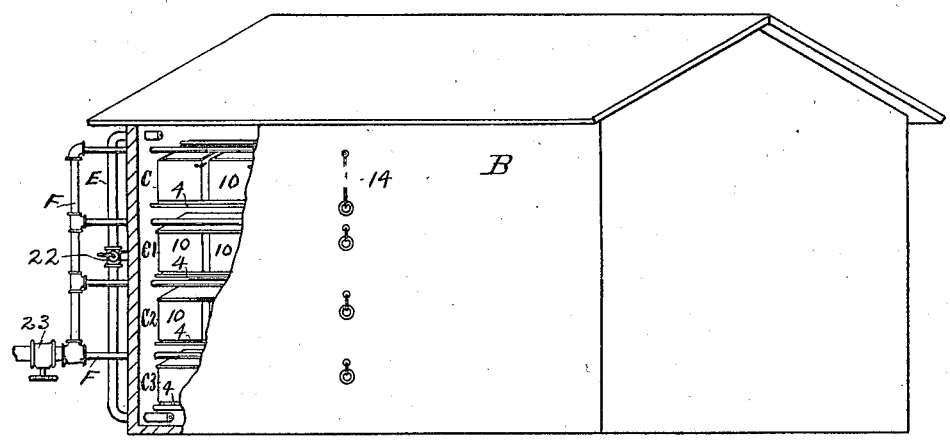
Figure 2:
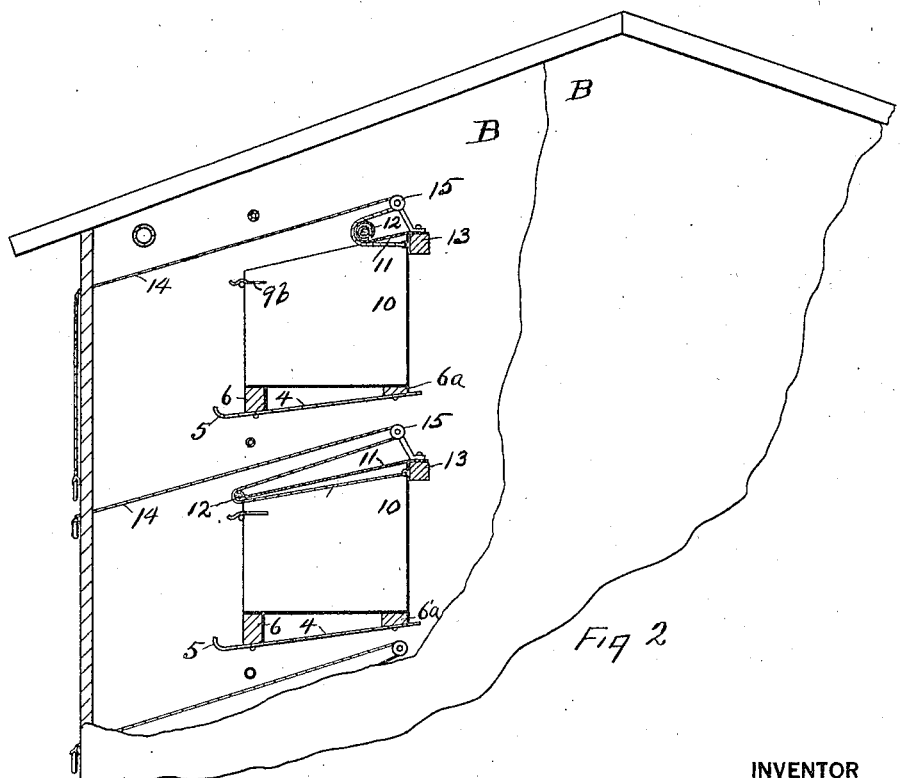
Figure 3:
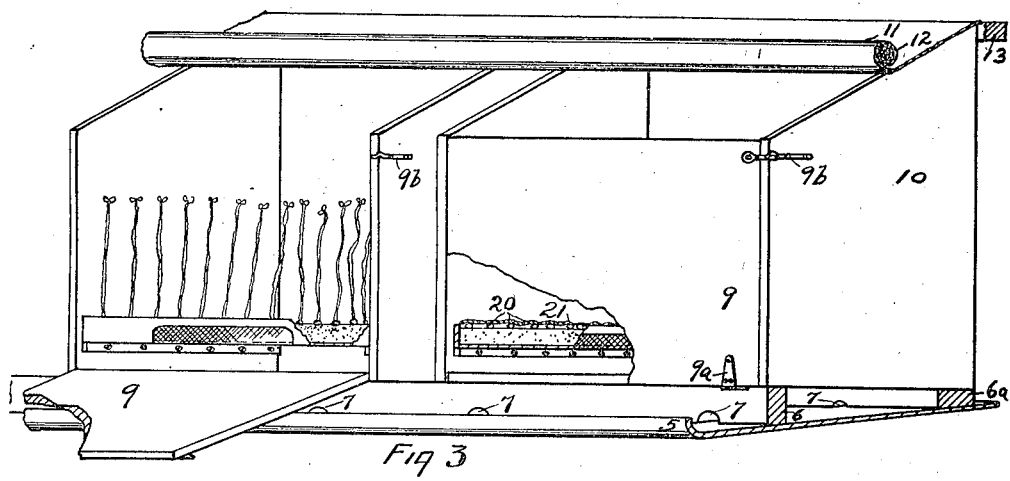
Figure 4:
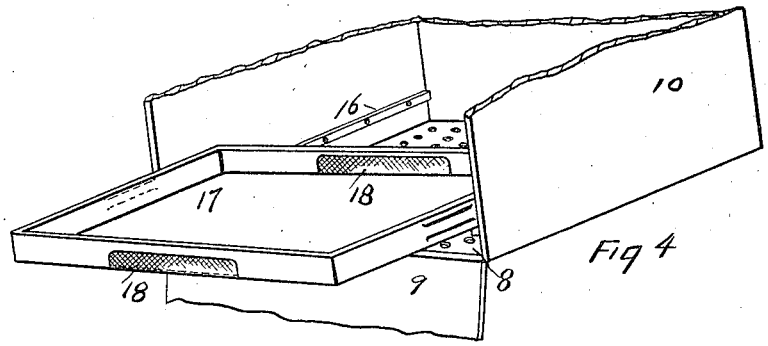

These objects are attained by means of the device hereinafter described and illustrated on the accompanying drawing in which Figure 1 is an outline of a building with a portion of one side cut away to show the interior arrangement of the propagating boxes and pipes. Figure 2 shows the building illustrated in Figure 1 with a portion of the end cut away to show the arrangement of the tiers of boxes from an end view. Figures 3 and 4 show unit boxes with portions of the walls cut away, the box in Figure 3 showing the sprouts partly grown in one compartment and the seeds in the first step of propagating in the second compartment. Figure 4 shows the box with one side dropped and the tray on which the propagating is done.

In said drawing B represents an enclosure or house in which the propagating is done; C, C¹, C² and C³ are a plurality of rows of boxes within the enclosure B. These rows of boxes are set upon shelves 4 which slope uniformly for drainage purposes as hereinafter set forth, said shelves terminating in an upwardly curved portion 5 at the lower edge for the purpose of conducting the drainage water to a predetermined place. The blocks 6 and 6ª are adapted to form a rest for the unit boxes D hereinafter more definitely described. The under openings 7 are devised to permit the drainage water to flow into the water conduit 5.

The box D is constructed with a perforated bottom 8, the perforations being adapted for drainage to shelf 5 above described. Three sides of the box are stationary and the fourth side, or front 9 is hinged to the bottom to give easy access to the interior of the box. The hinge is designated as 9ª and the latch for holding the lid in a closed position as 9ᵇ. The rear 10 of the box is constructed slightly higher than the front, and the sides of the box connecting the front and back have a uniform slope on the upper side, as it is desirable to keep the boxes covered during the greater period of growth to make the sprouts white and tender. I have placed a plurality of boxes in rows and have provided a canvas cover 11 which has a roller 12 attached to one edge, the other edge being attached to a rail 13 at the back of the boxes. A rope 14 is run under the canvas and attached at one end to the rail 13, passed around the roller 12, and back to a pulley 15 from whence it passes through an opening in wall B. By this device the canvas can be readily unrolled by releasing the rope so that it will cover the boxes, as gravity will draw the roller and canvas over the inclined top of the box, and by pulling the rope the canvas will be rolled up on the rollers.

Near the bottom of the box I have attached cleats 16 to form a slideway for a tray 17 which has screen mesh openings 18 therein to permit drainage therefrom.

The tray is covered with moistened sand 19 about one inch deep. The seeds or beans 20 are laid on the top of sand and covered with a cloth 21 for ten hours during the first stages of propagation, after which it is removed. When the tray is in the box the door 9 is closed and latched and the top covered.

The enclosure containing the boxes is kept at an approximately uniform temperature of 85° Fahrenheit by means of steam pipes E extending into the house from which steam is sprayed into the enclosure. The flow of steam is regulated by stop cock 22. The pipes F carry water for the purpose of washing the growing plants. They extend along the top of the boxes and when the water is turned on, a spray is showered on the plants beneath. The flow of water is regulated by stop cock 23.

The following steps are necessary in the production of this food. The temperature is kept by the steam at approximately 85° F. and the humidity is kept high by means of sprays of steam thrown directly into the enclosure. The boxes containing the growing malt is sprayed with water approximately every 2½ hours. The sprouts are more tender when not exposed to strong light, hence the boxes containing the growing sprouts are kept closed at all times except when the spraying is being done. The spray water is drained through the sand into the chamber between the tray and the bottom and from there to a conduit so that the plants are not lying in the water. This process is continued for approximately 55 hours when the product is ready to be cooked for food. It can be given a longer time for growth if desired.

Having described my invention I claim as new and ask for Letters Patent:

1. A process for malting beans consisting of planting seed beans in boxes which are kept closed, placing such boxes within an enclosure kept at approximately 85° Fahrenheit and at saturated humidity, and spraying the growing malt approximately once every 150 minutes.

2. A process for growing bean spouts consisting of planting the beans in moistened sand contained in a closed box, said closed box having means for draining excess moisture therefrom, said box being kept during the propagation of said sprouts within an enclosure heated with steam sprays to approximately 85° Fahrenheit, and said plants being subjected to washing sprays of cold water at intervals of approximately 155 minutes during said propagation.

KUMAKICHI ABE.